United States Patent
Epshetsky et al.

(10) Patent No.: US 8,720,903 B2
(45) Date of Patent: May 13, 2014

(54) FLUID SEAL ASSEMBLY

(75) Inventors: Yefim Epshetsky, Schaumburg, IL (US); Alex Paykin, Buffalo Grove, IL (US)

(73) Assignee: Aktiebolaget SKF, Gothenburg (SE)

( * ) Notice: Subject to any disclaimer, the term of this patent is extended or adjusted under 35 U.S.C. 154(b) by 521 days.

(21) Appl. No.: 12/782,631

(22) Filed: May 18, 2010

(65) Prior Publication Data

US 2011/0285089 A1    Nov. 24, 2011

(51) Int. Cl.
*F16J 15/32*    (2006.01)

(52) U.S. Cl.
USPC .................. 277/559; 277/560; 277/569

(58) Field of Classification Search
USPC .......................... 277/560, 569, 559
See application file for complete search history.

(56) References Cited

U.S. PATENT DOCUMENTS

| | | | |
|---|---|---|---|
| 4,440,405 A * | 4/1984 | Schaus et al. | 277/559 |
| 4,501,431 A * | 2/1985 | Peisker et al. | 277/559 |
| 4,519,616 A * | 5/1985 | Johnston | 277/560 |
| 4,667,968 A | 5/1987 | Nash et al. | |
| 4,969,653 A | 11/1990 | Breen | |
| 6,213,476 B1 | 4/2001 | Chandler | |
| 6,354,598 B1 * | 3/2002 | Huang | 277/551 |
| 6,620,361 B1 | 9/2003 | Longtin et al. | |
| 6,729,624 B1 * | 5/2004 | Johnston | 277/560 |
| 6,736,404 B1 | 5/2004 | Shuster | |
| 7,100,924 B2 * | 9/2006 | Toth et al. | 277/558 |
| 7,172,201 B2 * | 2/2007 | Uhrner | 277/559 |
| 7,419,165 B2 * | 9/2008 | Toth et al. | 277/569 |
| 7,464,942 B2 * | 12/2008 | Madigan | 277/569 |
| 7,832,100 B2 * | 11/2010 | Toth et al. | 29/888.3 |
| 8,181,971 B2 * | 5/2012 | Uhrner et al. | 277/559 |
| 2007/0057472 A1 * | 3/2007 | Hatch | 277/569 |

* cited by examiner

*Primary Examiner* — Vishal Patel
*Assistant Examiner* — Nicholas L Foster
(74) *Attorney, Agent, or Firm* — Inventa Capital PLC

(57) ABSTRACT

A fluid seal assembly (the assembly) of the present invention is disposed between an outer surface, i.e. engine block or any other part that requires application of the assembly and a rotatable member, such as, for example a shaft, wherein the assembly circumscribes the shaft and lubricated the shaft and the same rotates around the axis. The assembly includes at least three members: a casing unit, a sealing ring unit, and a collar. The assembly eliminates problems associated with prior art designs such as static leakage of oil, clogging up the spirals with carbonized oil that negatively impact lifecycle of the fluid seals.

24 Claims, 4 Drawing Sheets

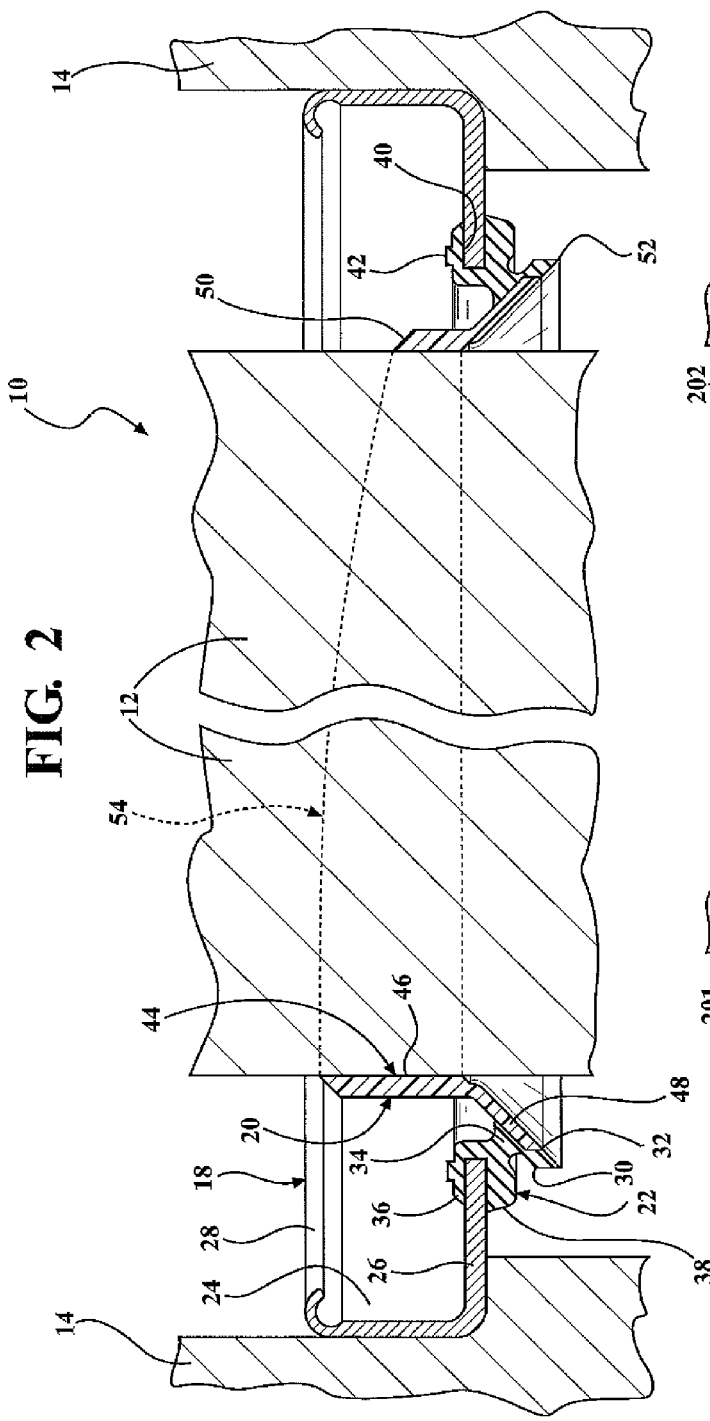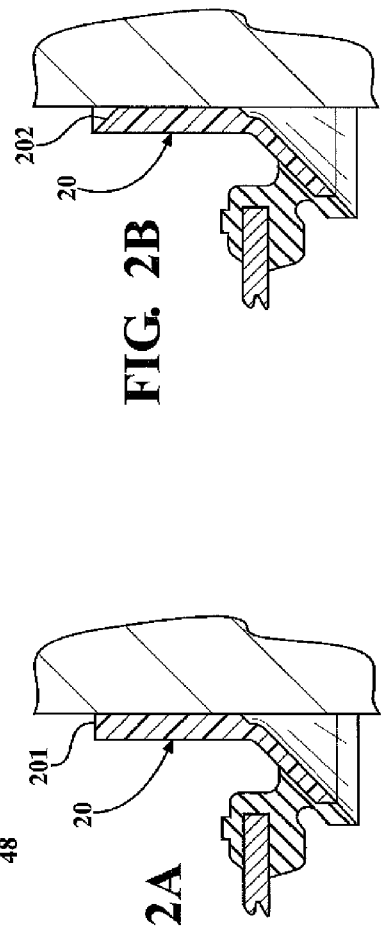

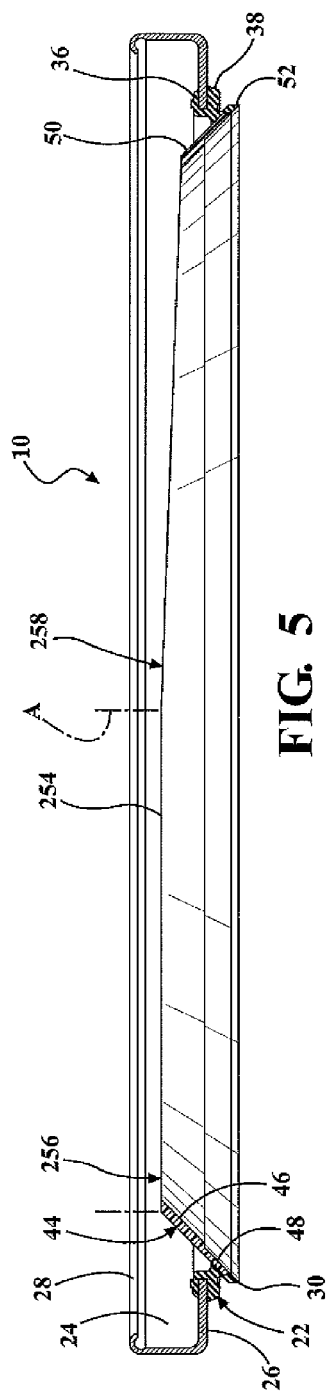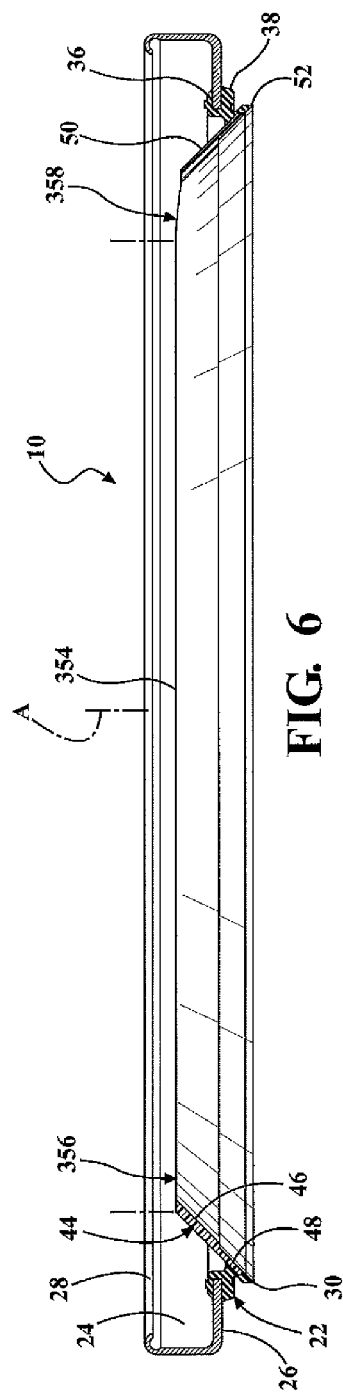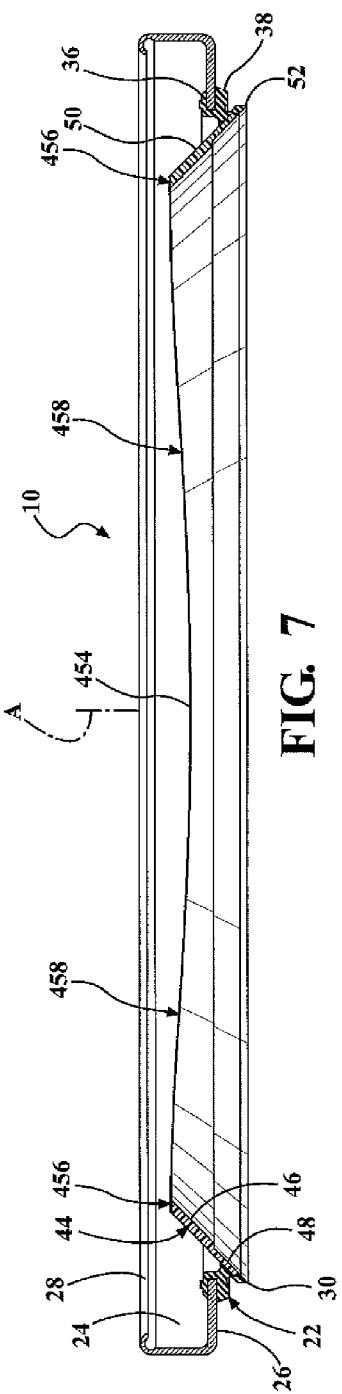

FLUID SEAL ASSEMBLY

FIELD OF THE INVENTION

The present invention relates generally to fluid seals for use with relatively rotatable members, such as shafts and the like.

BACKGROUND OF THE INVENTION

Fluid seals assemblies of various types are used in numerous applications including and not limited to sealing vehicular engine crankshafts, transmission shafts, bearing lubrication systems, compressor shaft support assemblies, and the like. The fluid seal assembly is designed to retain and seal oil or grease in a predetermined location for lubricating the shaft and to prevent ingress of environmental contaminants.

Typical fluid seal assembly includes a casing unit, a flexible sealing member having a sealing lip adapted to engage against a sealing surface of a relatively rotatable member, such as the shaft. The flexible sealing member includes a body portion extending to an annular flex portion of reduced cross-sectional thickness bonded to the metal case member and located intermediate the seal lip and metal case. The purpose of this flex section is to allow the seal lip to stay in continuous, intimate contact with the shaft it is to seal despite any lack of concentricity between the relatively rotating members, e.g. the rotating shaft and the stationery engine block into which the annular metal case member is installed.

It is important to constantly retain and seal oil or grease in a predetermined location for lubrication of the shaft and to prevent ingress of environmental contaminants. There are numerous prior art seal assembly designs, which are effective to return oil or other lubricant to the sealed cavity upon rotation of the shaft. In either case, relative motion between the shaft and the seal assembly serves to "pump" the oil, grease, or other sealed fluid back into the sealed region defined between the shaft and the seal assembly.

The art is replete with various prior art references related to numerous seal designed adaptable to retain and seal oil or grease in a predetermined location for lubrication the shaft. These prior art references include and are not limited to U.S. Pat. Nos. 4,501,431 to Peisker et al., 4,667,968 to Nash et al., 4,969,653 to Breen, 6,213,476 to Chandler et al., 6,620,361 to Longtin et al., and 6,736,404 to Shuster.

The U.S. Pat. No. 4,501,431 to Peisker et al., teaches a seal assembly including a casing unit, a resinous sealing ring unit, which is secured to the portion of the casing unit by an annular elastomeric bonding and a locating collar. A seal ring includes an active surface and a reverse surface. A single spiral groove or multiple grooves are formed along the active surface of the inner diameter portion of the ring. These grooves are hydrodynamic pumping elements whose general nature of operation is known to those skilled in the oil seal art.

The seal assembly taught by the U.S. Pat. No. 4,501,431 to Peisker et al. has several problems. The hydrodynamic features, such as spirals, are formed into the wafer portion of the seal, which contacts with the countersurface, i.e. the rotatable shaft. The location of the spirals or grooves results in clogging of these spirals or grooves with carbonized oil thereby reducing the lifespan of the seal assembly. Another problem is static leakage of oil through these spirals or grooves.

The U.S. Pat. No. 4,969,653 to Breen teaches a seal unit including a casing unit and an annular seal body portion extending to a flexible neck portion nearest the anchored portion of the seal body. The remainder of the seal body includes a primary seal lip and a secondary seal lip. The seal body includes a series of hydrodynamic groove configurations in the form of a single spiral groove hydrodynamically formed in the seal body. These grooves function as hydrodynamic pumping elements.

Similar to the seal assembly taught by the U.S. Pat. No. 4,501,431 to Peisker et al., the seal assembly taught by the U.S. Pat. No. 4,969,653 to Breen presents the same problems. The hydrodynamic features, such as grooves, are formed into portion of the seal which contacts with the countersurface, i.e. the rotatable shaft, thereby resulting in clogging of these grooves with oil or other lubricant, which reduces of the lifespan of the seal assembly and results in static leakage of oil through these grooves.

Hence, there is a need for an improved fluid seals and methods to eliminate problems associated with prior art designs such as static leakage of oil, clogging up the seals with carbonized oil that negatively impact lifecycle of the fluid seals. The inventive concept as set forth further below improves the aforementioned prior art systems and methods.

SUMMARY OF THE INVENTION

A fluid seals assembly (the assembly) of the present invention has numerous applications including and not limited to sealing vehicular engine crankshafts, transmission shafts, bearing lubrication systems, compressor shaft support assemblies, and the like. The assembly is disposed between an outer surface, i.e. a housing or an engine block or any other part that requires application of the assembly and a rotatable member, such as, for example a shaft, wherein the assembly circumscribes the shaft and lubricated the shaft as the same rotates around the axis. The assembly includes at least three members: a casing unit, a sealing ring unit, and a collar.

The casing unit is defined by a side wall contacting the outer surface and a flange radially extending from the side wall. The casing unit is formed from metals or metal alloys. The sealing ring unit is secured to the flange of the casing unit. A sleeve of the sealing ring unit presents a frustoconical configuration and includes a wafer portion extending to an annular lip. The wafer portion presents a first edge defining an upper diameter. The annular lip presents a second edge defining a lower diameter being larger than the upper diameter thereby defining the frustoconical configuration of the sleeve. An annular collar is connected to the annular lip and is used to receive the flange of the casing unit.

The sleeve presents a bi-directional hydrodynamic feature (the sealing face) located in a plane, which is not in direct contact with the shaft rotatable inside the sleeve. The sealing face is defined along the upper edge. The sealing face presents an angular or inclined plane. The angular plane slops angularly relative the second edge. The angular plane extends angularly relative the axis. The sealing face presents a flat portion extending in a parallel relationship with the lower edge and further extending to an angular portion, i.e. sloping angularly from the flat portion to the lower edge. The combination of the flat portion with the angular portion prevents static leakage of oil or other lubricants and allows constant lubrication of the shaft thereby elimination wear and tear of the sleeve.

An advantage of the present invention is to provide an improved fluid seal assembly that eliminated problems associated with prior art designs such as static leakage of oil, clogging up the spirals with carbonized oil that negatively impact lifecycle of the fluid seals.

Another advantage of the present invention is to provide the fluid seal assembly that presents the sealing face having no direct contact with the countersurface, i.e. a rotatable shaft thereby increasing the lifecycle of the fuel seal assembly.

Still another advantage of the present invention is to provide the fluid seal assembly that is cost effective in manufacturing.

Still another advantage of the present invention is to provide the fluid seal assembly that replaces prior art designs of the fluid seals having hydrodynamic features, such as unidirectional or bi-directional spirals, being cut or formed into the wafer portion of the seal which contacts with the countersurface, i.e. the rotatable shaft, thereby clogging these spirals with carbonized oil, which leads to reduction of the lifespan of the fluid seal assembly.

Other advantages and meritorious features of this invention will be more fully understood from the following description of the preferred embodiment, the appended claims, and the drawings; a brief description of which follows.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 illustrates a cross sectional and enlarged view of the seal assembly of FIG. 1;

FIG. 2A illustrates a fragmental view of a first alternative embodiment of a sleeve of the seal assembly;

FIG. 2B illustrates a fragmental view of a second alternative embodiment of the sleeve of the seal assembly; and FIGS. 3 through 7 illustrate cross sectional views of the seal assembly of several alternative embodiments wherein a bi-directional hydrodynamic feature of the seal is shown on an upper edge of the seal and varies in its length around the diameter of the upper edge.

DETAILED DESCRIPTION OF THE INVENTION

Figure 1:
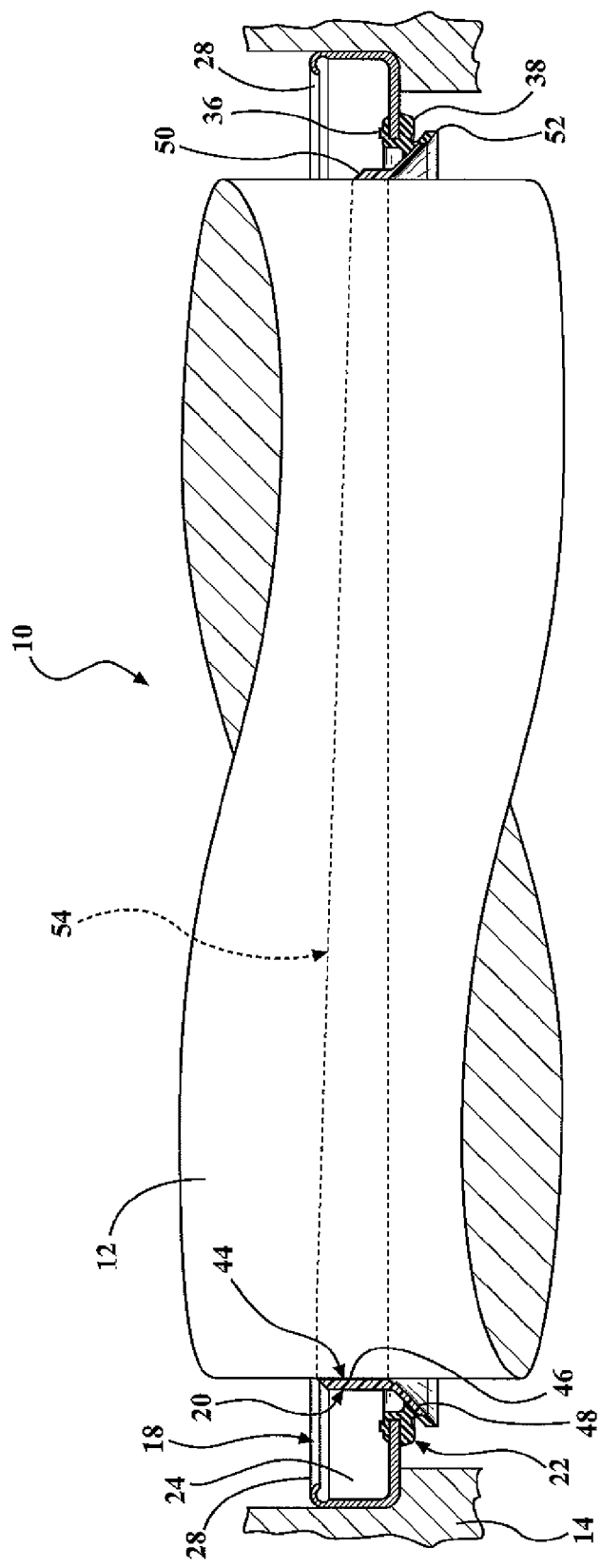
FIG. 1 illustrates a cross sectional view of a seal assembly circumscribing a rotatable shaft and disposed between the shaft and a countersurface.
Figure 3:
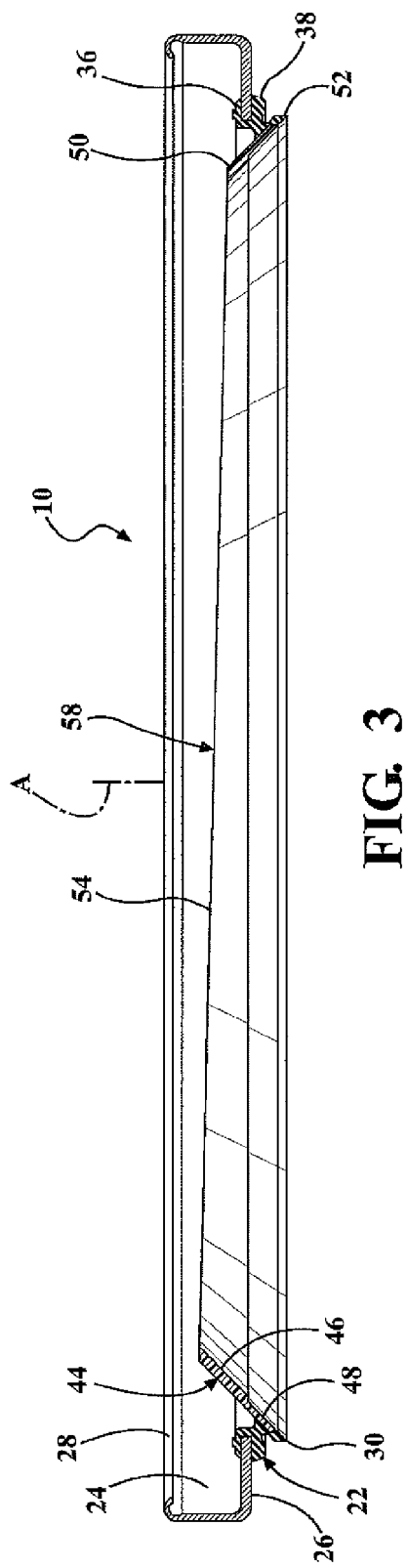

Referring to the Figure, wherein like numerals indicate like or corresponding parts throughout the several views, a fluid seal assembly (the assembly) of the present invention is generally shown at 10 FIGS. 1 through 7. The assembly 10 has numerous applications including and not limited to sealing vehicular engine crankshafts, transmission shafts, bearing lubrication systems, compressor shaft support assemblies, and the like, without limiting the scope of the present invention. FIGS. 1 and 2 illustrate only one example, wherein the assembly is disposed between a counterpart, such as a shaft 12 and a surface, such as an engine wall 14 or a housing of the kind. Those skilled in the mechanical art will appreciate that the shaft 12 and the engine wall 14 are shown for exemplary purposes only and are not intended to limit the scope of the present invention.

The assembly 10 includes at least three members: a casing unit, generally indicated at 18 in FIGS. 1 and 2, a sealing ring unit, generally indicated at 20 in FIGS. 1 and 2, and a collar member, generally indicated at 22 in FIGS. 1 and 2.

The casing unit 18 presents a rigid tubular member, i.e. a case defined by a side wall 24 contacting the surface 14 and a flange 26 radially extending from the side wall 24. The side wall 24 terminates into a free end 28 folded inside the casing unit 18. The free end 28 presents a semi-circular cross section. The casing unit 18 is formed from metals or metal alloys and is fabricated by stamping or casting. Those skilled in the art will appreciate that the material and methods of fabrication of the casing unit 18 are not intended to limit the scope of the present invention. The casing unit 18 is designed to support the sealing ring unit 20 and the collar member 22 that connects the sealing ring unit 20 with the casing unit 18.

As best shown in FIG. 2, the sealing ring unit 20 is secured to the flange 26 of the casing unit 18 through the collar member 22. The collar member 22 presents an inclined annular wall 30 defining a seat 32 to receive the sealing ring unit 20. A neck portion 34 homogeneously extends from the inclined annular wall 30 to an upper lip 36 and a lower lip 38 defining a nest or a void 40 therebetween to sandwich the flange 26 therebetween. The upper lip 36 and the lower lip 38 may extend further to encapsulate the side wall 24 and the flange 26. A rib 42 is defined on the upper lip 36 and extends around the upper lip 36 for reinforcement and structural integrity of the collar member 22. The collar member 22 is formed from flexible polymeric material such as resin, elastomer, and the like by injection molding or other fabrication methods. The materials and methods of formation of the collar member 22 are not intended to limit the scope of the present invention and are disclosed herewith for exemplary purposes.

The sealing ring unit 20 includes a sleeve, generally indicated at 44. The sleeve 44 presents a frustoconical configuration as best shown in FIGS. 3 through 6. The sleeve 44 of the frustoconical configuration or a "bell-mouthed" configuration presents an advantageous solution for engaging the shaft 14. It achieves this shape in the relaxed or as-formed condition. The sleeve 44 includes a wafer portion 46 extending to an annular lip 48. The wafer portion 46 and the annular lip 48 have different thickness without limiting the scope of the present invention. The wafer portion 46 presents a first or an upper edge 50 defining an upper diameter. The annular lip 48 presents a second or a lower edge 52 defining a lower diameter, being larger than the upper diameter thereby defining the frustoconical or "bell-mouthed" configuration of the sleeve 44. The sleeve 44 is formed from any suitable elastomeric materials, such as rubber, silicone, polyacrylic, fluoroelastomer, ethylene acrylic, silicone. The sleeve 44 may also be formed from other materials such as, for example, polytetrafluoroethylene (PTFE). The collar member 22 is connected, i.e. molded or fused to the annular lip 48 and is used to receive the flange 26 of the casing unit 20.

Alluding to the above, FIG. 2A illustrates a fragmental view of a first alternative embodiment of the sleeve 44 having a cross section 201 of the sleeve 44 extending substantially perpendicular to the axis A. FIG. 2B illustrates a fragmental view of a second alternative embodiment of the sleeve 44 having a cross section 202 of the sleeve 44 extending angularly relative to the axis A. The configurations of the cross sections as shown in FIGS. 2, 2A, and 2B are not intended to limit the scope of the present invention.

The sleeve 44 presents a bi-directional hydrodynamic feature (the sealing face), generally indicated at 54 in FIGS. 1 and 2, located in a plane, which is not in direct contact with the shaft 12 rotatable inside the sleeve 44. The sealing face 54 is defined along the upper edge 50. The sealing face 54 presents an angular or inclined plane, generally indicated at 58 in FIG. 3. The angular plane 58 slops angularly relative the lower edge 52. The angular plane 58 extends angularly relative a central axis, as generally indicated at A. The angle of the plane 58 is typically in the range of 0 to 10 degrees to the central axis A. The angle of the plane 58 may also extends through entire circumference or the upper diameter. The angle of the plane 58 may vary in the range of 0 to 10 degrees or more. The angle of the plane 58 is disclosed herewith in exemplary purposes and is not intended to limit the scope of the present invention.

Figure 4:
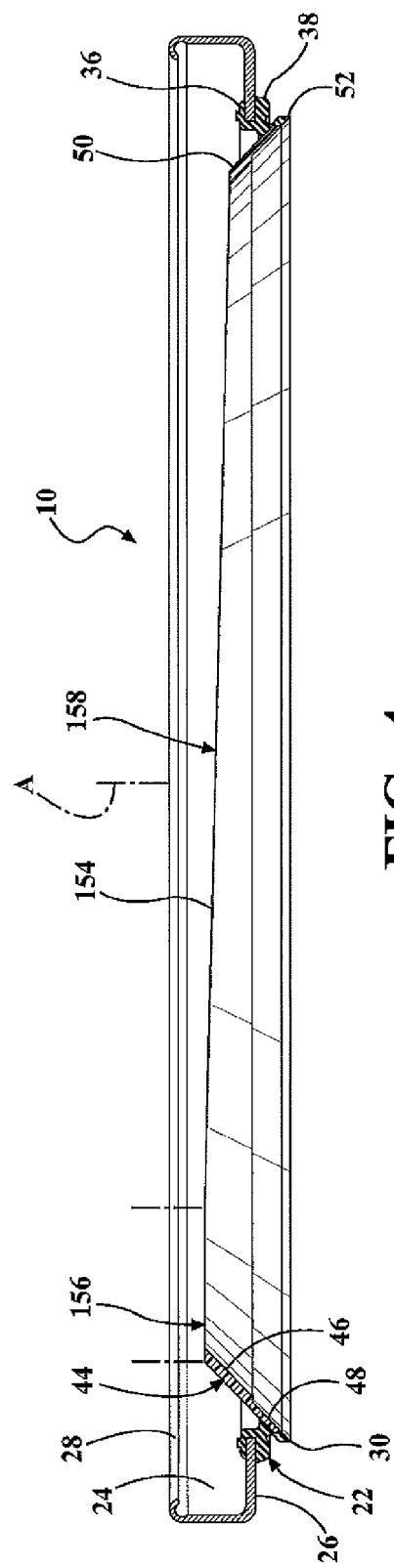

FIGS. 4 through 7 illustrate numerous alternative embodiments of the present invention. All aforementioned elements are numbered as shown above. Reference numerals will change in FIGS. 4 through 7 to distinguish alternative embodiments of the sealing face of the present invention. FIG. 4, for example, illustrates a first alternative embodiment of the assembly 10 wherein the sealing face 154 includes the flat segment, generally indicated at 156, and the angular segment, generally indicated at 158. The angular segment 158 slops from the flat segment 156.

FIG. 5 illustrates a second alternative embodiment of the assembly 10 wherein the sealing face 254 includes the flat segment, generally indicated at 256, and the angular segment, generally indicated at 258, sloping therefrom from the central axis A. FIG. 6 illustrates a third alternative embodiment of the assembly 10 wherein the sealing face 354 includes the flat segment, generally indicated at 356, and the angular segment, generally indicated at 358, sloping therefrom. The flat segment 356 extends substantially through the entirety of the sealing face 354.

Alluding to the above, FIG. 7 illustrates yet another alternative embodiment of the assembly 10. The sealing face 454 includes at least two flat segments, generally indicated at 456 and multiple angular segments, generally indicated at 458. The flat segments 456 are spaced from one another. There may be more than two flat segments 456 about the upper edge. The angular segment 458 slops downwardly from one flat segment 456 and then extends upwardly to the other flat segment 456 as illustrated in FIG. 7 thereby creating a wave-like configuration. The combination of the flat segment 56 with the angular segment 58 of the present invention prevents static leakage of oil or other lubricants and allows constant lubrication of the shaft 12 thereby elimination wear and tear of the sleeve 44. The combination of the flat segment 56 with the angular segment 58 of the present invention prevents static leakage of oil or other lubricants and allows constant lubrication of the shaft 12 thereby elimination wear and tear of the sleeve 44.

The assembly 10 of the present invention includes numerous advantages over the prior art references including and not limited to U.S. Pat. Nos. 4,501,431 to Peisker et al., 4,667,968 to Nash et al., 4,969,653 to Breen, 6,213,476 to Chandler et al., 6,620,361 to Longtin et al., and 6,736,404 to Shuster. The assembly 10 eliminates problems associated with prior art designs such as static leakage of oil, clogging up the spirals with carbonized oil that negatively impact lifecycle of the fluid seals. The assembly 10 provides the fluid seal design that presents the sealing face having no direct contact with the countersurface, i.e. a rotatable shaft 12 thereby increasing the lifecycle of the assembly 10.

Alluding to the above, the assembly 10 replaces prior art designs of the fluid seals having hydrodynamic features, such as unidirectional or bi-directional spirals, being cut or formed into the wafer portion of the seal which contacts with the countersurface, i.e. the rotatable shaft, thereby clogging these spirals with carbonized oil, which leads to reduction of the lifespan of the fluid seal assembly.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims

We claim:

1. A seal assembly for providing a seal between a cylindrical member and a housing, with the cylindrical member rotatable around a central axis and relative the housing, said seal assembly comprising:
   a sleeve secured to the housing and presenting a first edge defining a sealing face having a first smaller diameter, and the sleeve presenting a second edge defining a second larger diameter, with said sleeve presenting overall axial length being different at different circumferential positions of said sleeve; and
   said sealing face presenting an inclined part extending around substantially one half of said sealing face and angularly relative to the central axis, and said sealing face presenting a flat part extending around substantially another half of said sealing face and normal to the central axis with said inclined part and said flat part thereby forming a bi-directional hydrodynamic face for sealing the cylindrical member and the housing whereby a combination of said fiat part with said inclined part prevents static leakage of lubricants and allows lubrication of the shaft thereby reducing wear and tear of said sleeve.

2. The seal assembly as set forth in claim 1, wherein said flat part extends around more than half of said sealing face and said inclined part extends around less than half of said sealing face thereby forming said bi-directional hydrodynamic face for sealing the cylindrical member and the housing to prevent the static leakage of lubricants and allow the lubrication of the shaft thereby reducing the wear and tear of said sleeve.

3. The seal assembly as set forth in claim 1, including a casing unit defined by a side wall and a flange extending radially from said side wall, said sleeve connected to said flange.

4. The seal assembly as set forth in claim 1, wherein said sleeve includes a wafer portion extending to an annular lip.

5. The seal assembly as set forth in claim 1, wherein said sleeve is formed from at least one of rubber, silicone, polyacrylic, fluoroelastomer, ethylene acrylic, silicone, or polytetrafluoroethylene (PTFE).

6. The seal assembly as set forth in claim 1, wherein said inclined part presents an angle of inclination in the range of 0 to 10 degrees relative to a plane normal to the central axis.

7. The seal assembly as set forth in claim 3, including a collar member connected to said sleeve to secure said sleeve to said flange.

8. The seal assembly as set forth in claim 7, wherein said collar member presents a neck portion and an inclined annular wall defining a seat to receive said annular lip.

9. The seal assembly as set forth in claim 8, wherein said neck portion homogeneously extends from said inclined annular wall to an upper lip and a lower lip defining a nest therebetween to sandwich said flange between said upper lip and said lower lip.

10. The seal assembly as set forth in claim 9, including a rib defined on said upper lip and extending around said upper lip for reinforcement and structural integrity of said collar member.

11. The seal assembly as set forth in claim 7, wherein said collar member is formed from flexible polymeric material.

12. The seal assembly as set forth in claim 1, wherein said sleeve presents a frustoconical configuration.

13. A method of forming a seal assembly to provide a seal between a cylindrical member and a housing, with the cylindrical member rotatable around a central axis and relative the housing, said method comprising the steps of:

forming a sleeve presenting a first edge defining a sealing face having a first smaller diameter, and the sleeve presenting a second edge defining a second larger diameter, with the sleeve presenting an overall axial length being different at different circumferential positions of the sleeve;

forming an inclined part of the sealing face around substantially one half of the sealing face and angularly relative to the central axis; and forming a flat part of the sealing face around substantially another half of the sealing face and normal to the central axis, with the inclined part and the flat part thereby forming a bi-directional hydrodynamic face to seal the cylindrical member and the housing and prevent static leakage of lubricants to allow lubrication of the shaft and reduce wear and tear of the sleeve.

14. The method as set forth in claim 13, wherein the step of forming the sleeve is further defined by forming the flat part around more than half of the sealing face and forming the inclined part around less than half of the sealing face to form the bi-directional hydrodynamic face to seal the cylindrical member and the housing and prevent static leakage of lubricants to allow the lubrication of the shaft and the reduction of wear and tear of the sleeve.

15. The method as set forth in claim 13, including the step of forming a casing unit defined by a side wall and a flange extending radially from the side wall and connecting the sleeve to the flange.

16. The method as set forth in claim 13, including the step of forming the sleeve with a wafer portion extending to an annular lip.

17. The method as set forth in claim 13, including the step of forming the sleeve from at least one of rubber, silicone, polyacrylic, fluoroelastomer, ethylene acrylic, silicone, or polytetrafluoroethylene (PTFE).

18. The method as set forth in claim 13, including the step of forming the inclined part having an angle of inclination in the range of 0 to 10 degrees relative to a plane normal to the central axis.

19. The method as set forth in claim 15, including the step of forming a collar member connected to the sleeve to secure the sleeve to the flange.

20. The method as set forth in claim 19, including the step of forming the collar member with a neck portion and an inclined annular wall defining a seat to receive the annular lip.

21. The method as set forth in claim 20, including the step of forming the neck portion homogeneously extending from the inclined annular wall to an upper lip and a lower lip to define a nest therebetween to sandwich the flange between the upper lip and the lower lip.

22. The method as set forth in claim 21, including the step of forming a rib defined on the upper lip and extending around the upper lip to reinforce the collar member.

23. The method as set forth in claim 19, including the step of forming the collar member from a flexible polymeric material.

24. The method as set forth in claim 13, including the step of forming the sleeve to have a frustoconical configuration.

* * * * *